United States Patent [19]

Iglesias

[11] 4,287,905
[45] Sep. 8, 1981

[54] ANTI-BACKFLOW VALVE FOR A FAUCET

[76] Inventor: Gilberto Iglesias, 2940 SW. 99th Ave., Miami, Fla. 33165

[21] Appl. No.: 138,888

[22] Filed: Apr. 10, 1980

[51] Int. Cl.³ .............................................. F16K 15/18
[52] U.S. Cl. .................................... 137/102; 137/218; 137/596
[58] Field of Search ............... 137/102, 107, 218, 596, 137/625.2

[56] References Cited

U.S. PATENT DOCUMENTS

| | | | |
|---|---|---|---|
| 2,037,023 | 4/1936 | Holby | 137/218 |
| 2,162,671 | 6/1939 | Groeniger | 137/218 |
| 2,233,200 | 2/1941 | Dreyer | 137/218 |
| 3,202,165 | 8/1965 | Yavicoli | 137/107 |
| 3,974,848 | 8/1976 | Wheatley | 137/102 |

FOREIGN PATENT DOCUMENTS 708139 4/1954 United Kingdom ................ 137/102

Primary Examiner—Robert G. Nilson
Attorney, Agent, or Firm—Robert J. Van Der Wall

[57] ABSTRACT

A pair of interlocked flap valves within a faucet, such as a hose bib, provides for a fluid flow from a pressurized source through a discharge outlet while preventing a back flow to the source due to a lower pressure at the source than exists downstream as would occur within a resilient garden hose filled with water, sealed off, and being heated by the sun. A first flap valve, comprising a check valve, automatically closes when the main line pressure drops substantially or completely ceases, or by backflow pressures. When the check valve closes, an interlock connection thereof to a second flap valve, comprising a relief valve, simultaneously opens said relief valve relative to a relief port for outward discharge of the fluid. A manual control knob provides for selective "on-off" operation of the check valve.

10 Claims, 3 Drawing Figures

ANTI-BACKFLOW VALVE FOR A FAUCET

BACKGROUND OF THE INVENTION

Hose bibs are generally installed in outside building walls as a controlled source of water supply for garden hoses or the like. Such hoses attached to a hose bib often lie with their downstream ends in pools of muddy water which are often contaminated by chemical sprays, fertilizers and other poisonous materials, or are left dangling in swimming pools or various other receptacles. If the main water pressure from the source drops to form a vacuum or a sufficient back pressure develops, the contaminated or chemical laden water is sucked or forced backwardly into the pure water supply system, resulting in a health hazard to the users of water from the supply system.

This problem is well known in the plumbing art and a number of prior are patents disclose devices which attempt to circumvent it. U.S. Pat. Nos. 3,906,987 to Aushforth, et al., and 4,117,856 to Carlson disclose very complicated cross-connection valves for use in a main water supply conduit and provide no direct garden hose connection. Both of these devices are quite complex, utilizing pluralities of individual valving means and springs, making them not only costly to produce but they would appear to be unreliable due to their complexity. U.S. Pat. No. 2,037,023 to F. A. Holly illustrates a siphon breaker for interposition in the discharge line of a tank truck and includes a single movable flap which is pressure operated from a closed position relative to the discharge line to a closed position relative to a vent diring a discharging operation. This device is intended to combat a siphoning through the device only, a back pressure obviously not being encountered.

U.S. Pat. Nos. 3,416,556 to A. B. Nelson, 2,927,598 to W. Van E. Thompson and 3,454,032 to W. W. Hinz, et al., concern relatively complicated anti-backflow and vacuum breaker valves which are quite similar to the foregoing insofar as they incorporate floating, generally drum type valves. These valves operate on vertical guide means to vent or discharge flow fluids to the outside through top opening vents.

U.S. Pat. No. 3,565,097 to Robert B. Costa also employe a vertically slidable valve on a vertical post and operates in a manner quite similar to the three preceding discussed patents.

U.S. Pat. No. 3,424,188 to W. C. Whitaker, et al., discloses a faucet including a pop-up valve which responds vertically to supply line pressure to open and permit a discharge of water from the faucet. When a reduction of pressure occurs within the supply line so that the pressure in the faucet is less than atmospheric pressure, the pop-up element moves downwardly permitting an air flow into the faucet to break the vacuum in the supply line.

None of the above patents provide a positive interlock between a main check valve and a relief valve to insure a simultaneous operation thereof and eliminating partial or delayed operation of one of two valve means involved.

The present invention concerns a faucet such as a hose bib, which is particularly adapted for connection to a garden hose, and provides a very simplified valve means, utilizing no springs, in the form of a pair of interlocked flap valves which coact to permit a flow of pressurized water from a source through a supply conduit to the hose through the hose bib, with a control handle in an open position; and to divert a backflow of water from the hose to the faucet through a relief port in the faucet for outside discharge.

Therefore, one of the principal objects of the present invention is to provide a faucet such as a hose bib with a simplified valve means in the form of a pair of interlocked flap valves which coact to direct a flow of pressurized water from a source to a garden hose, for example, in first positions, and react to back pressures from the hose or negative pressures in the source, to second positions to close relative to the source and open relative to a relief port for outside discharge of any backflow from the hose.

A further object of the invention is to provide manual control means such as a handle to selectively secure said valves in said first positions, or permit said valves to be pressure operated to the second positions.

Other objects and advantages will become apparent to those skilled in the art upon reading the following descriptions and upon reference to the drawings.

DETAILED DESCRIPTION

Figure 1:
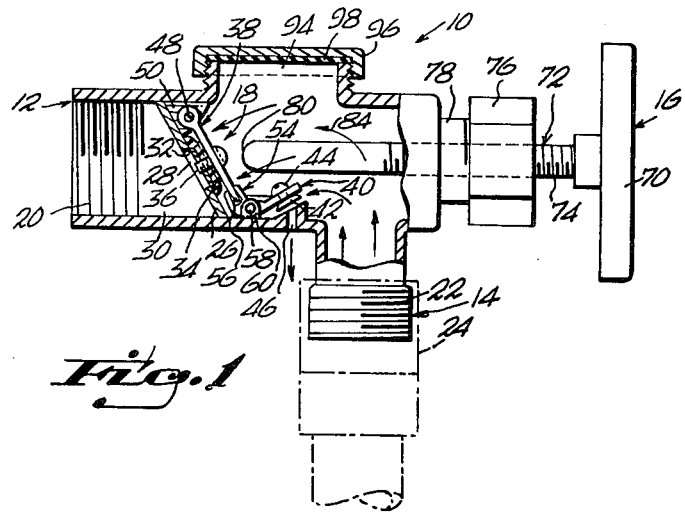
FIG. 1 is a partially broken vertical longitudinal sectional view through a hose bib incorporating the valve means of the present invention in a first position.
Figure 2:
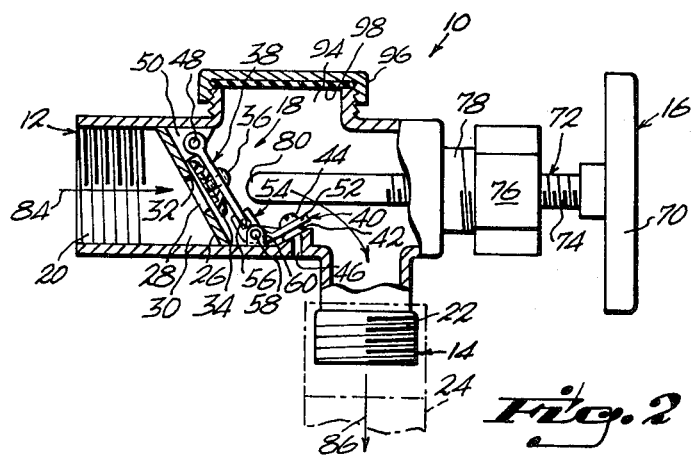
FIG. 2 is a similar section view with the valve means in a second position.

With reference to the drawings, and particularly to FIGS. 1 and 2, a faucet such as a hose bib assembly, incorporating the present invention and indicated generally at 10, includes an inlet end 12, and a generally downwardly angled outlet end 14, a manual control means 16, and a pair of interlocked flap valve means 18.

The inlet end 12 is illustrated with interior screw threads 20 for connection to a water supply conduit extending from a supply source, however, any conventional attachment means may be provided to accommodate any conventional plumbing installation. The outlet end 14 is exteriorly threaded at 22 to receive a garden hose coupling illustrated in phantom at 24.

A downwardly forwardly angled septum 26 with a central port opering 28 is fixed within a chamber 30, inwardly of inlet end 12, and provides a peripheral valve seat portion 32 about the inner periphery of opening 28 to seat a valve gasket 34 secured centrally by screw and nut means 36 to a first flap valve, comprising a check valve 38, of flap valve means 18. A second flap valve, comprising a relief valve 40, includes a valve gasket 42, secured thereto by screw and nut means 44 in a central position for operation between open and closed positions. FIGS. 1 and 2, relative to a relief port 46 formed in a bottom portion of hose bib 10 between septum 26 and the outlet end 14.

Check valve 38 is pivoted across its upper end on a pin 48 fixed between a pair of ears, one illustrated at 50, disposed between an upper end of septum 26 and the interior top wall of inlet end 12. Relief valve 40 includes a generally forwardly extending portion 52 carrying valve gasket 42 and an upwardly angled yoke portion 54 to engagingly receive a lower tip end 56 of check valve 38.

A pivot pin 58 is engaged through relief valve 40 between gasket portion 52 and yoke 54. A pair of ears, one illustrated at 60, extending upwardly from a bottom wall of hose bib 10 forwardly of septum 26 carries pivot pin 58.

Manual control means 16 includes an outer control knob 70 fixed to a forwardly extending axial rod 72 including a screw threaded outer portion 74, threaded through a cap nut 76, engaged on a threaded forwardly extending sleeve portion 78 of the hose bib 10.

In the drawings, an inner distal end 80 of rod 72 is disengaged from check valve 38. As illustrated in FIG. 1, check valve 38 is normally closed by gravity forces and the relief valve 40 is is open. However, back pressures indicated by arrows 82 will insure the closure of check valve 38 and pressurized fluids entering through outlet 14 will be exhausted through relief port 46. Check valve 38 will likewise close as in FIG. 1 in the event of vacuum forces in a conduit from a fluid source. A pressurized fluid indicated by arrow 84, FIG. 2, from a source entering inlet end 12 passes through inlet port 28 in septum end 26 and rocks valve means 18 about pivot pins 48, 58 to open check valve 38 to permit a fluid flow from outlet end 14, see arrow 86. Simultaneously, the relief valve 40 closes relative to relief port 46.

Figure 3:
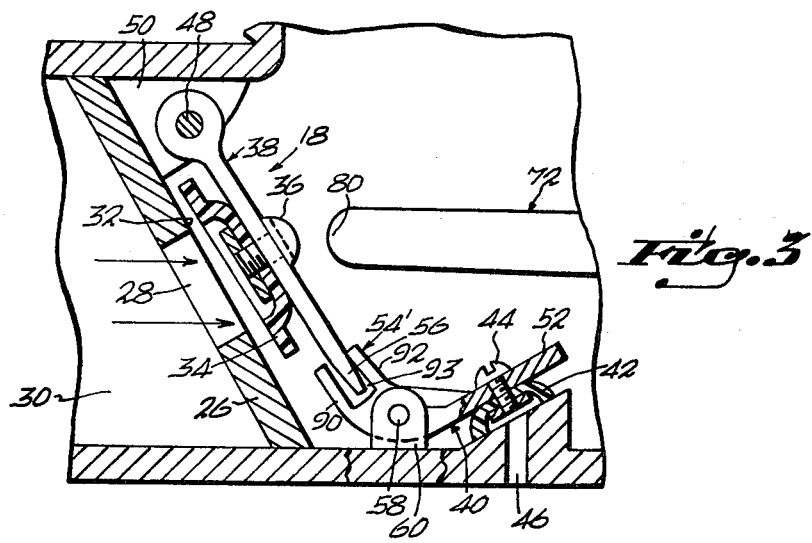
FIG. 3 is a substantially enlarged fragmentary sectional view similar to FIG. 1 illustrating a slight modification of the valve means.

The enlarged sectional view of FIG. 3 illustrates all of the above described features of the flap valve structure in addition to a somewhat modified yoke structure 54. As illustrated, the yoke structure includes 2 arms 90, 92 defining a throat 93 for reception of lower tip end 56 of check valve 38. Both sides of tip end 56 are oppositely angled relative to respective yoke arms 90, 92 in a manner so as to prevent a binding during relative movements thereof. In the modification of FIG. 3, the throat 93 is widened somewhat to increase the spacing between arms 90, 92 relative to the thickness of tip end 56. This provides a predetermined degree of lost pivotal movement of check valve 38 relative to relief valve 40 before said relief valve is opened. This results in a wider opening of check valve 38 relative to inlet port 28. A desired maximum amount of opening of check valve 38 can therefore be determined by the spacing between arms 90, 92. Also, when the axial pin 72 is threaded inwardly to engage the check valve 38, a degree of adjustment in water volume flow is provided without opening the relief valve 40. When pin 72 is threaded inwardly until pin portion 80 engages and closes check valve 38, the relief valve 40 opens in the same manner as in FIGS. 1 and 2.

A top maintenance opening 94, above flap valve assembly 18, is provided with a cap 96 and gasket 98 as illustrated in FIGS. 1 and 2.

Having described the presently preferred embodiments of the invention, it should be understood that various changes in construction and arrangement will be apparent to those skilled in the art and are fully contemplated here without departing from the true spirit of the invention. Accordingly, there are covered all alternatives, modifications and equivalents as may be included with the spirit and scope of the invention as defined solely by the appended claims.

What is claimed is:

1. An anti-backflow valve comprising
an inlet from a fluid source;
an outlet;
an interior chamber defined by a valve body in fluid communication with the inlet and outlet;
a septum including an inlet port disposed between the inlet and interior chamber;
a check valve within the chamber, pivotally movable in relation to the inlet port to open and close same;
a relief valve pitotally movable in relation to the relief port to open and close same;
valve interlocking means cooperating between the check valve and the relief valve so that the relief valve is closed in relation to the relief port when the check valve is open in relation to the inlet port and vice versa; and
means adjustable between a closed operator position in contact with the check valve to maintain same closed and the interlocked relief valve open, and an open operator position allowing the check valve to open, resulting in closing of the interlocked relief valve.

2. The valve of claim 1, wherein the septum is angled forwardly and downwardly from the inlet to the outlet.

3. The valve of claim 1, wherein the check valve further comprises a pivoted connection transversely across a top potion of the interior chamber, and the relief valve further comprises a pivotal connection transversely across a bottom portion of the interior chamber, said relief valve pivotal connection intermediate between a first end proximate the relief port and a second end proximate valve interlocking means.

4. The valve of claim 3, wherein the valve interlocking means comprises a throat defining yoke on the second end of the relief valve and an extended end of the check valve distal from its pivotal connection, said extended end received within the throat of the yoke.

5. The valve of claim 4, wherein the throat is of greater width than the width of the extended end.

6. The valve of claim 4, wherein the yoke and extended end are in opposed but parallel relation to each other and dimensioned to permit a predetermined amount of relative movement between the check valve and relief valve.

7. The valve of claim 1, wherein the operator means further comprises:
an axially movable rod penetrating through a wall of the valve body to the interior chamber;
a handgrip fixedly attached to a first end of the rod extending outside of the antibackflow valve;
screwthreads movably mating the exterior surface of the rod to the wall of the valve body near the rod's point of penetration therethrough; and
a second end of the rod axially movable to make contact with a face of the check valve within the interior chamber.

8. The valve of claim 1, which further comprises resilient gaskets positioned respectively between inlet port and check valve, and between relief port and relief valve, to seal said ports when closed.

9. The valve of claim 1, further comprising:
a maintenance opening in fluid communication with the interior chamber, penetrating the valve body;
a removable cap in engagement with said opening and sealing means between the maintenance opening and removable cap.

10. An antibackflow valve comprising:
an inlet from a fluid source;
an outlet;
an interior chamber defined by a valve body in fluid communication with the inlet and outlet;
a septum, including an inlet port disposed between the inlet and the interior chamber;

a check valve within the chamber, pivotally movable in relation to the inlet port to open and close same;

a relief port through valve body in fluid communication with the interior chamber;

a relief valve pivotally movable in relation to the relief port to open and close same;

valve interlocking means cooperating between check valve and relief valve, including a throat defining yoke on the relief valve and an extended end of the check valve, said extended end received within the throat of the yoke, the throat being of greater width than the extended end; and operator means including an axially movable rod penetrating through a wall of the valve body to the interior chamber, a handgrip fixedly attached to a first end of the rod extending outside of the anti-backflow valve, screw threads movably mating the exterior surface of the rod to the wall of the valve body near the rod's point of penetration therethrough, and a second end of the rod axially movable to make contact with a face of the valve within the interior chamber.

* * * * *